United States Patent [19]

Kobayashi et al.

[11] Patent Number: 4,689,447

[45] Date of Patent: Aug. 25, 1987

[54] GRAPHICAL INPUT DEVICE WITH RULES

[75] Inventors: Tadashi Kobayashi; Toshio Sato, both of Tokyo, Japan

[73] Assignee: NEC Corporation, Japan

[21] Appl. No.: 803,078

[22] Filed: Nov. 29, 1985

[30] Foreign Application Priority Data

Nov. 30, 1984 [JP] Japan ............................ 59-181837[U]

[51] Int. Cl.⁴ .............................................. G08C 21/00
[52] U.S. Cl. ....................................................... 178/18
[58] Field of Search ............................ 178/18, 19, 20

[56] References Cited

U.S. PATENT DOCUMENTS 4,164,622  8/1979  Pobgee ................................. 178/18
4,484,026  11/1984  Thornburg ........................... 178/18

Primary Examiner—Stafford D. Schreyer
Attorney, Agent, or Firm—Ostrolenk, Faber, Gerb & Soffen

[57] ABSTRACT

A graphical input device having lines or rules visible through an input surface of a flexible sheet. The flexible sheet is at least partially transmissive to light and is located to face a base plate. The front surface of the flexible sheet is for entering graphical information and upon the rear surface is located the lines or rules. Resistive films are applied to both the base plate and the rear surface of the flexible sheet and the films face each other for facilitating the detection of coordinates associated with the graphical information entered on the front surface and for converting the coordinates to an electrical signal.

5 Claims, 6 Drawing Figures

GRAPHICAL INPUT DEVICE WITH RULES

BACKGROUND OF THE INVENTION

The present invention relates to a graphical input device and, more particularly, to a graphical input device that generates an electrical signal representative of coordinates of any particular point on a predetermined input surface at which a character or a diagram is entered by handwriting.

A graphical input device is generally constructed to detect coordinates of a point on an input surface, or writing surface, where information is handwritten and to generate an electrical signal (coordinates signal) indicative of that particular point. This kind of input device has been put to practical use as an input terminal for communications.

A type of graphical input device known in the art includes a pair of sheets which are each provided with a resistive layer and are separated by a predetermined air gap from each other. In this type of device, when information is written by hand on the surface of one of the two sheets, the resistive layers on the sheets are brought into contact at the specific handwritten point so that coordinates representative of that point are detected based on the resulting changes in the resistance across the opposite sides of the respective sheets. For details of such a prior art device, a reference may be made to U.S. Pat. No. 3,959,585 and U.S. Ser. No. 605,651 filed Apr. 30, 1984. While the described type of graphical input terminal has been marketed to serve as an electronic blackboard or like communications terminal, an attempt to develop a graphical input terminal which is provided with lines or rules on its input surface has not been made. This presumably stems from the fact that in such a graphical input device the input surface of which is flexible, lines or rules which may be provided by painting the input surface are apt to come off, due to flection of the input surface and rubbing with a writing implement during entry of information. Meanwhile, a graphical input device having an input surface implemented with a resistive sheet has the problem that errors are introduced in detecting the coordinates due to an uneven distribution of surface resistivity which develops during the course of deposition of a resistive layer. The uneven surface resistivity distribution in turn results from irregular printing of a resistive material and/or an uneven temperature distribution on the resistive surface during solidification which relies on baking. Such errors would cause the graphical information reproduced from detected coordinates to differ in position from the actually entered graphical information.

SUMMARY OF THE INVENTION

It is therefore an object of the present invention to provide a graphical input device which is provided with lines or rules on the back of its writing surface to prevent them from being erased while graphical information is entered and, in addition, to allow a minimum of error to develop in coordinates detection.

In accordance with the present invention, there is provided a graphical input device which includes a base plate, and a flexible sheet located to face the base plate and which is partially transmissive to light. The flexible sheet is provided with rules on its back. When a certain point on the surface of the flexible sheet is depressed, coordinates associated with that point is converted to an electrical signal.

In a preferred embodiment of the present invention, the base plate is provided with a first resistive film on one surface thereof. The flexible sheet is provided with a second resistive film which faces the first resistive film with the intermediary of an air gap. The rules are defined by conductors which are engageable with the second resistive film. In this construction, the rules are visible through an input surface of the flexible sheet and, yet, prevented from being erased during entry of information. In addition, the second resistive film is uniform in potential along the rules, thereby eliminating an uneven surface resistance distribution.

BRIEF DESCRIPTION OF THE DRAWINGS

The present invention will be better understood from the following detailed description taken in conjunction with the accompanying drawings in which.

DETAILED DESCRIPTION OF THE PREFERRED EMBODIMENTS

Preferred embodiments of the present invention will be described with reference to the accompanying drawings.

Figure 1A:
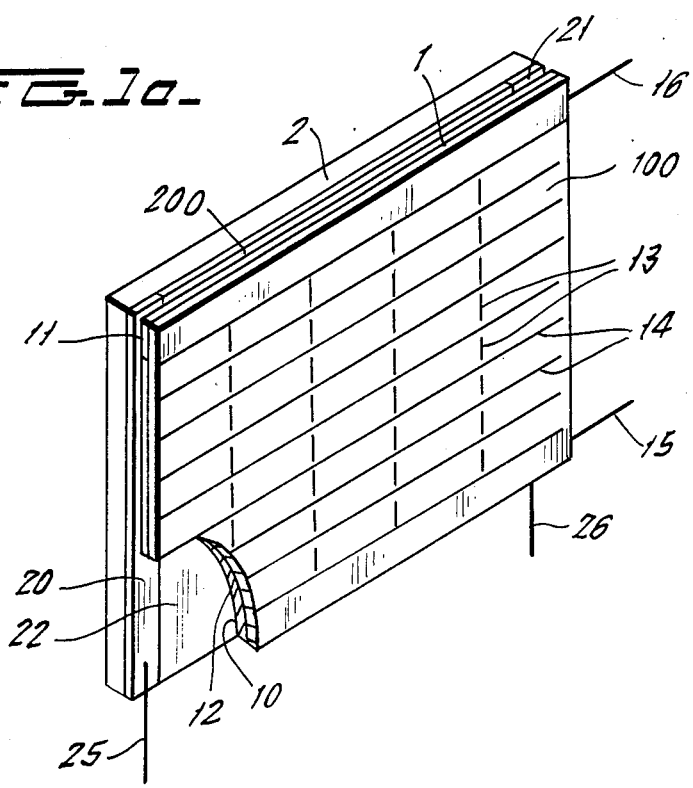
FIGS. 1a and 1b show a graphical input device embodying the present invention in a perspective view and a fragmentary perspective view, respectively.
Figure 1B:
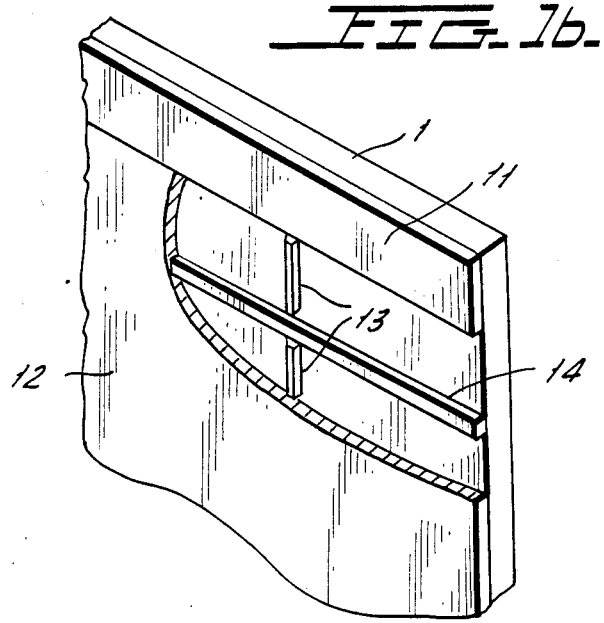

Referring to FIGS. 1a and 1b, a graphical input device in accordance with the first embodiment of the present invention is shown and includes a flexible sheet 1 made of semi-transparent, white or whitish polyester. The flexible sheet 1 has a front surface 100 which serves as an input surface, or writing surface, for entering graphical information into the device. Parallel vertical rules 13 and parallel horizontal rules 14 are provided on the back of the sheet 1 which is opposite to the input surface 100. Bar electrodes 10 and 11 are rigidly mounted on the back of the sheet 1 to extend respectively along lower and upper edges of the sheet 1.

The input surface 100 appears white or whitish with a tint of another color mixed so that a sufficient contrast to the color of a writing implement such as a pen may be obtained to render entered information legible. Such an input surface 100 may be produced by mixing a coloring material in the flexible sheet 1 or by printing a coloring material on the back of the sheet 1. The horizontal rules 14 which ar parallel to the bar electrodes 10 and 11 are provided by screen-printing silver paste or like conductive paste while the vertical rules 13 perpendicular to the bar electrodes 10 and 11 are provided by printing insulative paste. Resistive paste of black carbon is printed over the back of the sheet 1 from above the rules 13 and 14 and, then, solidified by baking to form a resistive film 12 which covers the rules 13 and 14. In the case where the rules 13 and 14 are so thick that undulations are apt to develop on the surface of the resistive film 12, the rules 13 may be so formed as not to overlap with the rules 14 at their intersections, as shown in FIG. 1b. If there is no fear of such undulations, the rules 13 and 14 may be printed in such a manner as to overlap each other at their intersections. The rules 13 and 14 are tinted in a color different from that of the resistive film 12 to allow the former to be clearly visible through the input surface 100.

As described above, since the rules 13 and 14 are provided on the back of the flexible sheet 1, they are prevented from being removed or worn out even through the input surface 100 may be rubbed with a writing implement. In addition, every point of the horizontal rules 14 which are made of a conductive material develops an equal potential when energized, thereby significantly reducing coodinates detection errors due to an uneven surface resistivity distribution of the resistive film 12.

A base plate 2 is separated from the resistive film 12 by an air gap 200. Bar electrodes 20 and 21 extend on the front surface of the base plate 2 along opposite edges of the latter which are perpendicular to those edges along which the bar electrodes 10 and 11 extend. The bar electrodes 20 and 21 are interconnected by a resistive film 22. The resistive film 22, like the resistive film 12, is formed by printing carbon paste on the base plase 21 and, then, solidifying it by baking.

Leads 15 and 16 respectively are connected to the bar electrodes 10 and 11 which are rigid on the resistive film 12, while leads 25 and 26 respectively are connected to the bar electrodes 20 and 21 which are associated with the resistive film 22. The leads 15, 16, 25 and 26 commonly terminate at a coordinates detection circuit, not shown, which is adapted for the detection of coordinates of any point on the input surface 100 at which information is handwritten.

Figure 2:
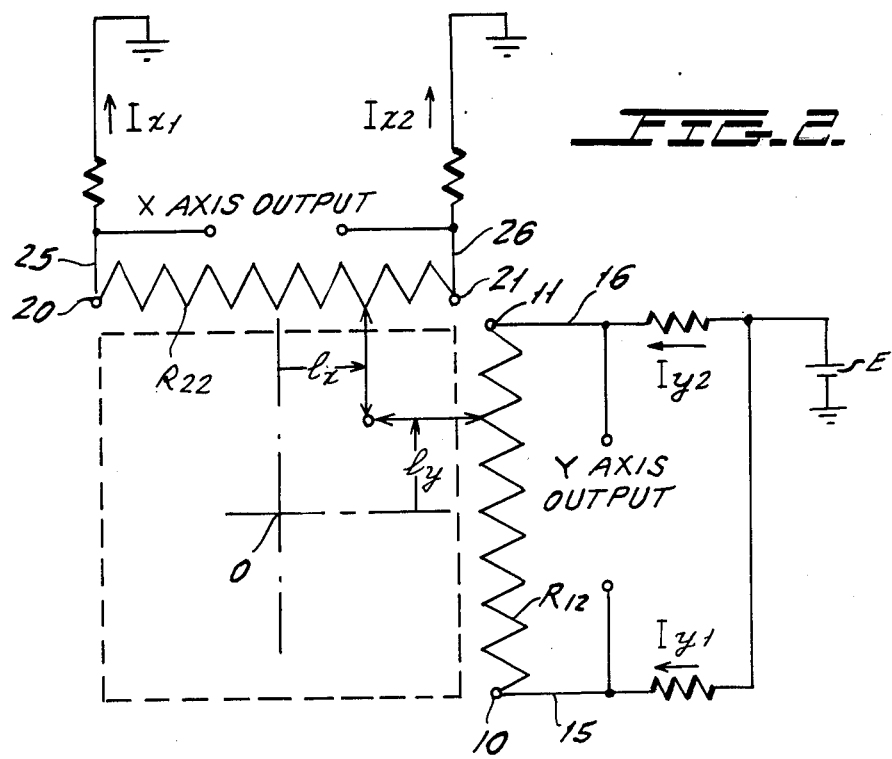
FIG. 2 is a diagram showing an equivalent circuit associated with coordinates detection in accordance with the embodiment of FIGS. 1a and 1b.

Referring to FIG. 2, the principle of coordinates detection in accordance with the illustrative embodiment of FIGS. 1a and 1b is demonstrated. In FIG. 2, the phantom block represents the input surface 100 and the center thereof, O, defines the origin of the coordinates system. The surface resistivity of the resistive film 12 between the bar electrodes 10 and 11 is represented by $R_{12}$, and that of the resistive film 22 between the bar electrodes 20 and 21 by $R_{22}$. Each of the bar electrodes 10 and 11 is connected via a resistor to the positive terminal of a DC power supply E. Each of the bar electrodes 20 and 21, on the other hand, is connected to ground via a resistor.

Assume that the resistive films 12 and 22 have made contact with each other at a certain point P on the input surface 100. Then, using currents $I_{y2}$, $I_{y1}$, $I_{x1}$ and $I_{x2}$ which flow through the leads 15, 16, 25 and 26, respectively, the distances $l_x$ and $l_y$ of the point of contact P from the center O may be expressed as:

$$l_x = A \frac{I_{x1} - I_{x2}}{I_{x1} + I_{x2}} \quad \text{Eq. (1)}$$

$$l_y = B \frac{I_{y1} - I_{y2}}{I_{y1} + I_{y2}} \quad \text{Eq. (2)}$$

where A and B are proportional constants.

The X and Y coordinates can be detected at the same time in terms of currents which flow at opposite ends of the resistive films. Assuming that the power supply E is a constant current source, then denominators in the Eqs. (1) and (2) are constants so that coordinates detection will be further facilitated.

For details of such a coordinates detection system, reference may be made to Tadashi KOBAYASI, "CRT Touch Pannel Suitable for Selection of Image Data", THE JOURNAL OF THE INSTITUTE OF ELECTRONICS AND COMMUNICATION ENGINEERS OF JAPAN, Vol. 67, No. 6 June 25, 1984, pp. 654–656.

Figure 3:
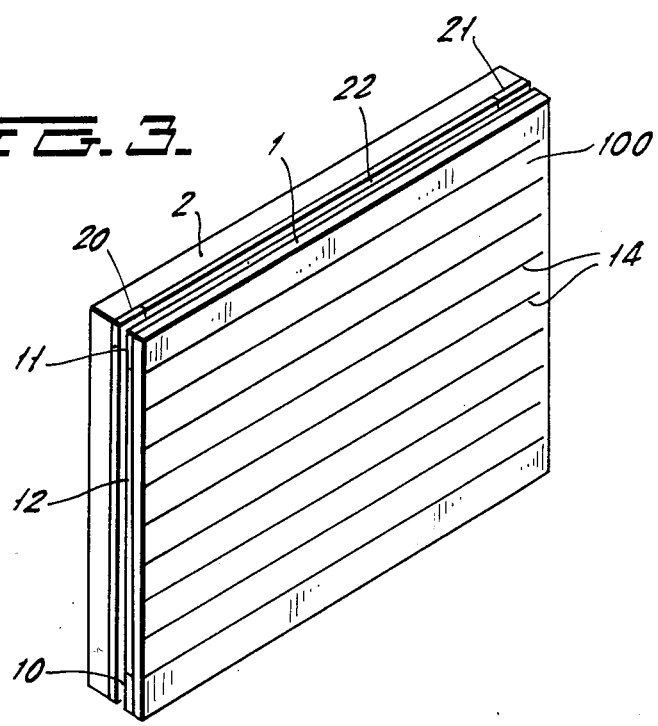
FIG. 3 is a perspective view of another embodiment of the present invention.

Referring to FIG. 3, another embodiment of the present invention is shown wherein rules extending in one direction only are required. Specifically, this particular embodiment is essentially similar to that of FIGS. 1a and 1b except for the omission of the vertical rules 13 on the flexible sheet 1. It will be apparent that providing the conductive rules 14 on the back of the flexible sheet offers the same effects as described in relation to the first embodiment.

Figure 4A:
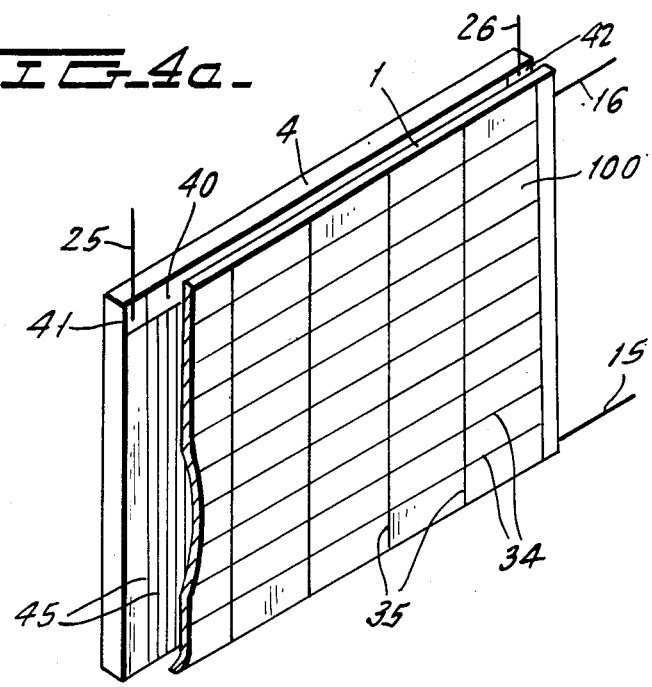
FIGS. 4a and 4b respectively are a perspective view and a fragmentary perspective view of still another embodiment of the present invention.
Figure 4B:
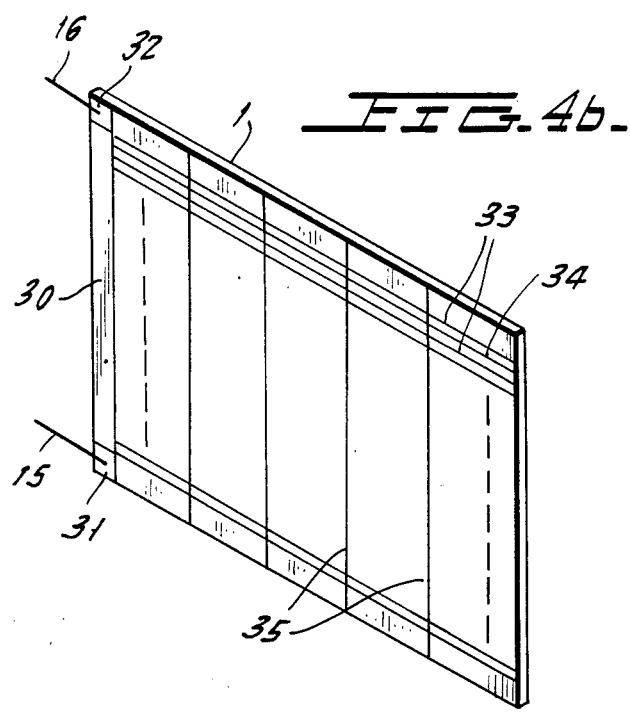

Referring to FIGS. 4a and 4b, still another embodiment of the present invention is shown. In this particular embodiment, conductive lines 33 and rules 34 each in a stripe configuration are printed on the surface of the white or whitish flexible sheet 1 opposite to the input surface 100 to extend horizontally thereon in an alternating fashion. One end of each of the conductive lines 33 and rules 34 is connected to a resistive film 30 which extends along one side edge of the sheet 1. Insulative rules 35 are printed on the same surface as the rules 34 and perpendicular to the latter. The resistive film 30 which extends on the back and along one edge of the sheet 1 as above mentioned is connected at one end to a terminal electrode 31 and at the other end to another terminal electrode 32. Conductive lines 45 are printed in a stripe configuration and are perpendicular to the conductive lines 33. Conductive lines 45 are on the front surface of the base plate 4, which is separated by an air gap from the back of the sheet 1. The conductive lines 45 are connected at one end to a resistive film 40 which extends on the front surface and along one edge of the base plate 4. The opposite ends of the resistive film 40 are connected to terminals 41 and 42, respectively. In FIG. 4b, while the rules 34 are conductive and electrically operate in the same manner as the conductive lines 33 during entry of graphical information, the rules 34 and 35 are painted black so that they may appear conspicuous when seen through the input surface 100.

When information is written into a certain desired point on the input surface 100, the flexible sheet 1 yields to cause any of the conductive lines 33 and the rules 34 to make contact with the conductive line 45 at that particular point, thereby setting up electrical connection therebetween. At this instant, as in the embodiment of FIGS. 1a and 1b, an electrical signal representative of the coordinates of the point of contact is generated by detecting a current which then flows from the power supply to the point of contact via the leads 15 and 16 and resistive film 30 and a current which is shunted at the point of contact toward the leads 25 and 26 via the resistive film 40.

In summary, it will be seen that the present invention provides a graphical input device which is provided with rules on the back of an input surface so that the rules are prevented from coming off or from being rubbed off by repeated writing operations. In addition, the device of the present invention entails a minimum of error in the detection of coordinates.

What is claimed is:

1. A graphical input device, comprising:
   a base plate;
   a flexible sheet formed of a translucent or transparent material, said flexible sheet having a rear surface facing said base plate and an input surface onto which graphical information may be entered by depressing said input surface;

a plurality of rules regularly located on said rear surface of said flexible sheet and being visible through said flexible sheet from a position in front of said input surface;

a first resistive film located on said rear surface of said flexible sheet and overlapping said rules so as to sandwich said rules between said flexible sheet and said first resistor film, said rules being formed of a conductive material and developing a substantially equal potential therein when energized to compensate for any uneven surface resistivity distribution of said first resistive film;

a second resistive film formed on said base plate and facing said first resistive film;

a spacer element normally maintaining an air gap between said resistive films, said air gap being of a width sufficient to allow contact of said restive films when graphical information is entered by depressing said input surface of said flexible sheet;

a pair of first bar electrodes disposed at opposite ends of said first resistive film and connected to said first resistive film; and a pair of second bar electrodes disposed at opposite ends of said second resistive film and connected to said second resistive film.

2. A graphical input device according to claim 1, wherein said conductive rules are parallel to one another.

3. A graphical input device according to claim 1, further comprising a plurality of insulated rules located on said rear surface of said flexible sheet, said insulated rules being angularly disposed with respect to said conductive rules.

4. A graphical input device according to claim 3, wherein said plurality of insulated rules do not overlap said conductive rules at their intersections.

5. A graphical input device according to claim 1, further including circuit means coupled to said pairs of bar electrodes for generating an output signal indicative of the position along said input surface at which said graphical information has been entered by the user of said graphical input device.

* * * * *